J. A. CAMERON ET AL

May 5, 1931. WINDING MACHINE Re. 18,060

Original Filed Jan. 7, 1928 3 Sheets-Sheet 1

Inventors
James A. Cameron
George B. Rickard
By their Attorney

J. A. CAMERON ET AL

May 5, 1931. WINDING MACHINE Re. 18,060

Original Filed Jan. 7, 1928 3 Sheets-Sheet 2

Inventors
James A. Cameron
George B. Rickard
By their Attorney
Fred W. Beecher

J. A. CAMERON ET AL

May 5, 1931. WINDING MACHINE Re. 18,060

Original Filed Jan. 7, 1928 3 Sheets-Sheet 3

Inventors
James A. Cameron
George B. Rickard
By their Attorney
Fred Beecher

Reissued May 5, 1931 Re. 18,060

UNITED STATES PATENT OFFICE

JAMES A. CAMERON, OF BROOKLYN, NEW YORK, AND GEORGE B. RICKARD, OF GLEN ROCK, NEW JERSEY, ASSIGNORS TO CAMERON MACHINE COMPANY, OF BROOKLYN, NEW YORK, A CORPORATION OF NEW YORK

WINDING MACHINE

Original No. 1,759,538, dated May 20, 1930, Serial No. 245,075, filed January 7, 1928. Renewed November 16, 1929. Application for reissue filed August 27, 1930. Serial No. 478,260.

This invention relates to winding machines, especially of the type that winds flexible material into large and heavy rolls. Machines of this type are provided with two surface winding drums spaced apart and rotatable in the same direction, a winding shaft, to receive flexible material, being placed in the valley between the drums. In order to get the winding shaft, with its accumulated material, out of the machine resort has to be had to cranes or tackle and as the object being handled is of considerable bulk and weight and the working space within the machine is somewhat limited difficulty is experienced in carrying out the operation.

The main object and feature of the invention is to provide suitable ejecting means to move the winding shaft with its accumulated material upwardly out of the valley between the drums and outwardly over one of said drums so that it will be in position where it can be easily and conveniently handled either by means of skids or by tackle.

In the accompanying drawings the invention is disclosed in a concrete and preferred form in which.

Figure 1:
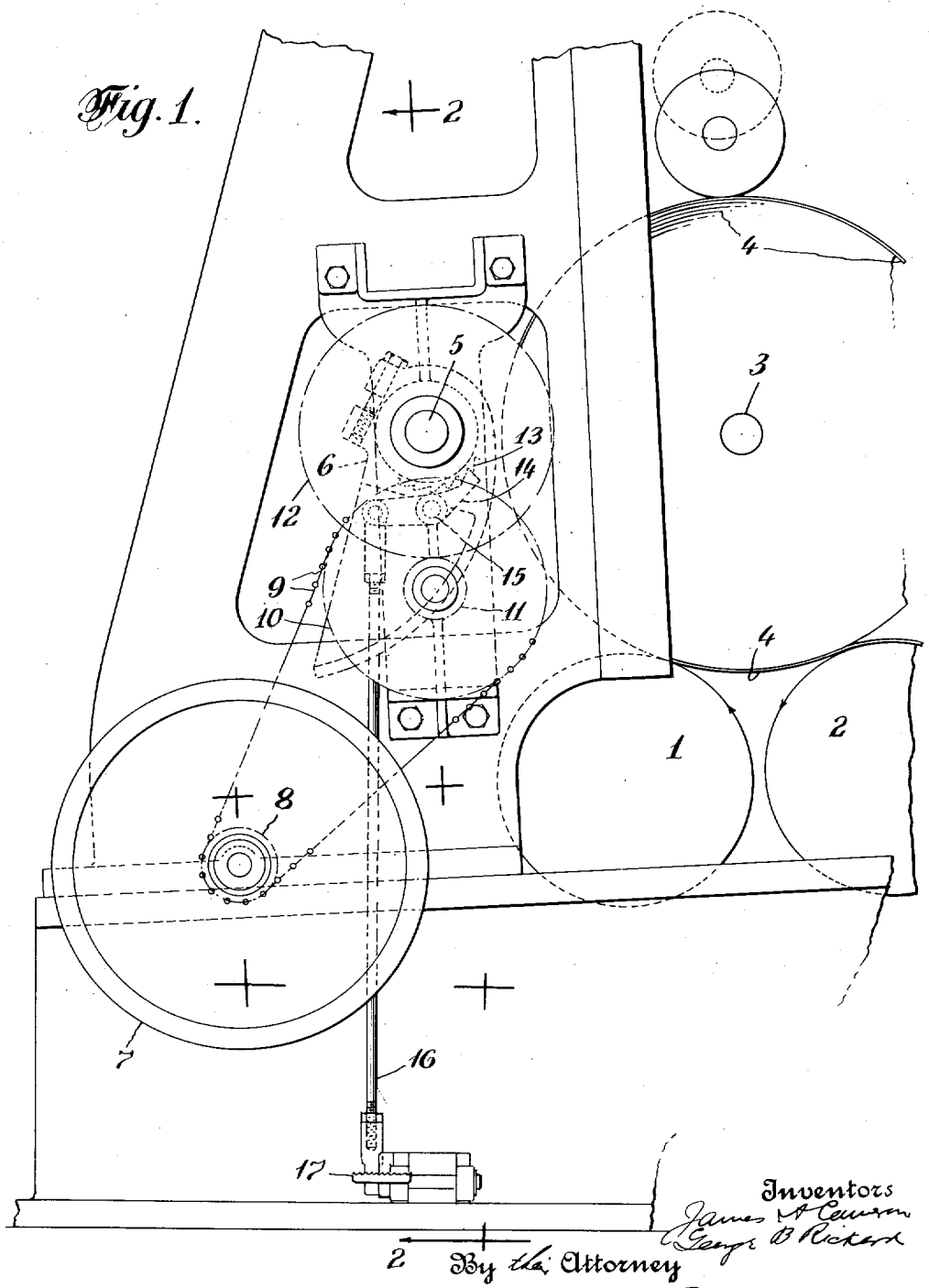
Fig. 1 is a somewhat diagrammatic view in side elevation of a winding machine embodying one form of the invention.
Figure 2:
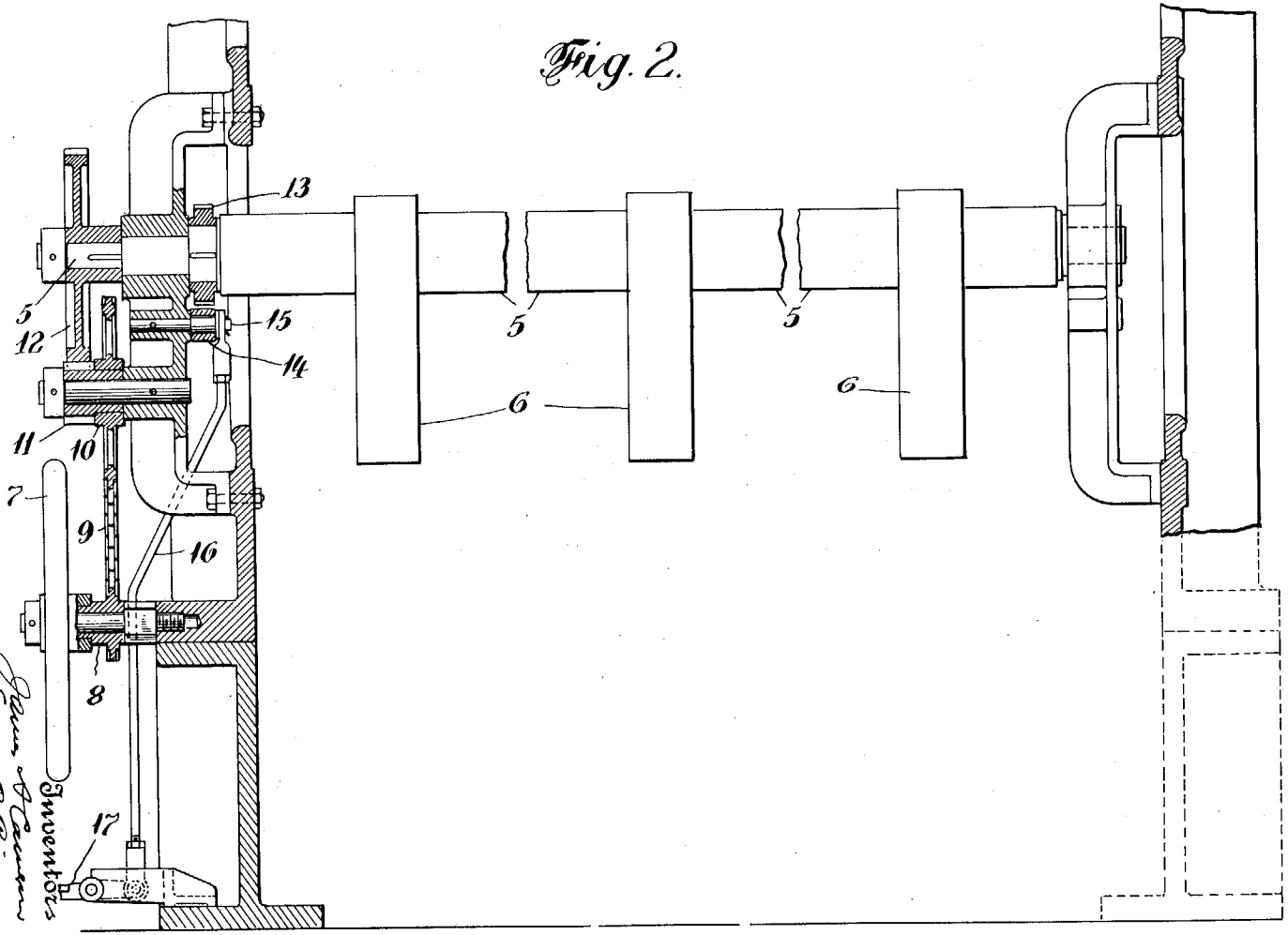
Fig. 2 is a transverse vertical sectional view substantially in the planes of irregular line 2—2 of Fig. 1.
Figure 3:
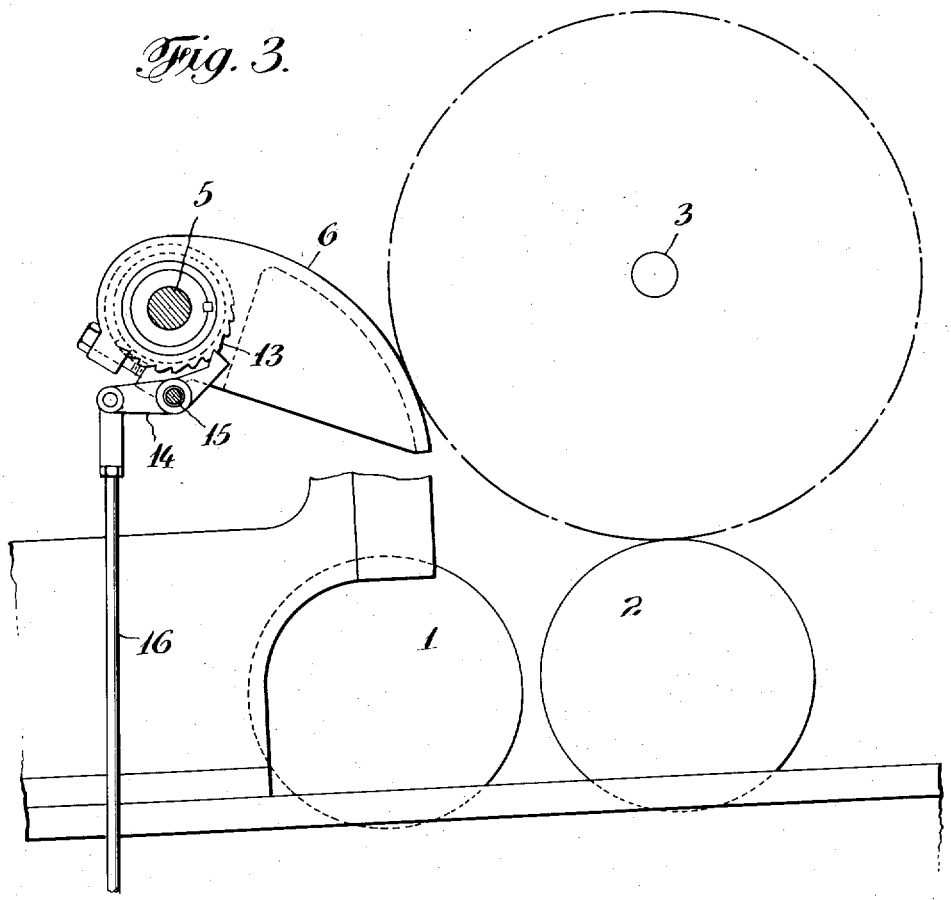
Fig. 3 is a diagrammatic view similar to Fig. 1 showing the ejecting means as having moved the winding shaft and roll out of the valley between the drums.
Figure 4:
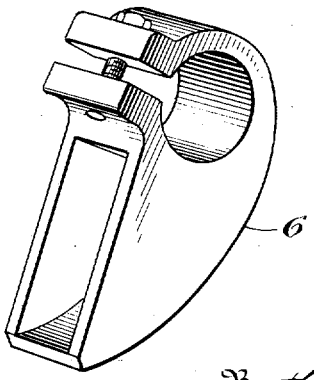
Fig. 4 is a perspective detail view of one of the ejecting members.

Only so much of the winding machine as is necessary to a disclosure of the invention is shown, as machines of this general type are well known in the art. As here indicated, 1 and 2 are surface windings drums spaced apart and rotatable in the same direction. 3 is a winding shaft to be placed in the valley between the drums and to receive a roll, consisting of one or more coils, of flexible material 4. 5 is a cross-shaft suitably pivoted in the framework of the machine and carrying one or more ejecting members 6 to eject the winding shaft and roll. Such ejecting members are preferably cam-shape as shown and may bear against the winding shaft itself, at either end of the roll, or there may be a single central member bearing against the roll of material; in the present case a number of such members are shown bearing against the roll. During the winding operation the ejecting members occupy the position indicated in Fig. 1, out of contact with the roll, said members being conveniently urged into this position by their own weight, but when the winding operation is completed, and the roll of material is to be removed, shaft 5 is turned and the ejecting members are swung against the roll to move it upwardly and outwardly as indicated in Fig. 3. Owing to the cam-shape of the engaging surface of ejecting member 6, it will be seen that when said surface first engages shaft 3, or its roll of flexible material, that portion of said cam surface which is near center of shaft 5 will first be brought into action and then, as shaft 5 turns, portions more remote from the center of shaft 5 will become effective. The result is that the shaft and its roll of material, will at first be moved relatively slowly and then with a gradually accelerated movement. This obviates the necessity of a sudden impact against the shaft or roll, which impact might strain the shaft or mark the roll.

Suitable actuating means are associated with the ejecting members, said actuating means being here constructed as follows: 7 indicates a handwheel provided with a sprocket 8 over which latter passes chain 9 trained at its other end over sprocket 10. Sprocket 10 carries a pinion 11 that meshes with gear 12 on shaft 5. From this it will be seen that rotation of handwheel 7 will, through the reduction gearing specified, actuate the ejecting members.

It is of advantage not merely to eject the roll but also to sustain it in a partly ejected position, such as indicated in Fig. 3 for instance so that skids or tackle may be brought into play. To accomplish this a ratchet and pawl device is employed and such device may be associated with shaft 5 or with any rotatable member forming a part of the train of connections from the handwheel. In the present case, a ratchet 13 is mounted on shaft 5 and associated therewith is a pawl 14 which when it engages the ratchet prevents backward rotation. Pawl 14 is pivoted at 15 and is connected by means of rod 16 to foot treadle 17. A spring or the weight of the parts normally holds the pawl out of engagement with the ratchet, and the operation of the foot treadle brings them into engagement. If desired, the foot treadle can be provided with the usual latch (not shown) to hold the parts in engagement and to prevent its return.

We claim:

1. In a winding machine, the combination with two surface winding drums spaced apart and rotatable in the same direction, and a winding shaft to be placed in the valley between the drums and to support a roll of flexible material, of ejecting means to move the winding shaft and its roll of flexible material upwardly out of said valley and outwardly over one of said drums including a pivotally supported member and an actuating device therefore and a ratchet and pawl associated with said ejecting means to prevent backward and downward movement of said ejecting means.

2. In a winding machine, the combination with two surface winding drums spaced apart and rotatable in the same direction, and a winding shaft to be placed in the valley between the drums and to support a roll of flexible material, of ejecting means to move the winding shaft and its roll of flexible material upwardly out of said valley and outwardly over one of said drums at first relatively slowly and then with a gradually accelerated movement, comprising: a pivoted shaft and a member carried thereby having a cam-shape engaging surface.

3. In a winding machine, the combination with two surface winding drums spaced apart and rotatable in the same direction, and a winding shaft to be placed in the valley between the drums and to support a roll of flexible material, of ejecting means other than one of the winding drums to move the winding shaft and its roll of flexible material upwardly out of said valley and outwardly over one of said drums at first relatively slowly and then with a gradually accelerated movement.

4. In a winding machine, the combination with two surface winding drums spaced apart and rotatable in the same direction and a winding shaft to be placed in the valley between the drums and to support a roll of flexible material, of ejecting means to move the winding shaft and its roll of flexible material upwardly out of said valley and outwardly over one of said drums at first relatively slowly and then with a gradually accelerated movement including: a member having a relatively great lever power at the beginning of the ejecting movement coupled with a relatively slow motion imparted to said roll, the power of said member diminishing and the speed of the motion imparted to the roll increasing as the ejecting movement continues.

5. In a winding machine, the combination with two surface winding drums spaced apart and rotatable in the same direction, and a winding shaft to be placed in the valley between the drums and to support a roll of flexible material, of ejecting means to move the winding shaft and its roll of flexible material upwardly out of said valley and outwardly over one of said drums at first relatively slowly and then with a gradually accelerated movement, including: a shaft mounted to turn and a member carried thereby having a relatively great lever power at the beginning of the ejecting movement coupled with a relatively slow motion imparted to said roll, the power of said member, diminishing and the speed of the motion imparted to the roll increasing as the ejecting movement continues.

6. In a winding machine the combination with two surface winding drums spaced apart and rotatable in the same direction, and a winding shaft to be placed in the valley between the drums and to support a roll of flexible material, of ejecting means other than one of the winding drums to move the winding shaft and its roll of flexible material upwardly out of said valley and outwardly over one of said drums with a relatively slow outward motion at the early stages of the upward travel of said roll from the valley between the drums, and a relatively fast outward motion of said roll as the energy required for upward lift abates and becomes available for outward propulsion.

Signed at New York city, in the borough of Brooklyn, county of Kings, and State of New York, this 21 day of August, 1930.

JAMES A. CAMERON.
GEORGE B. RICKARD.